Figure 1:
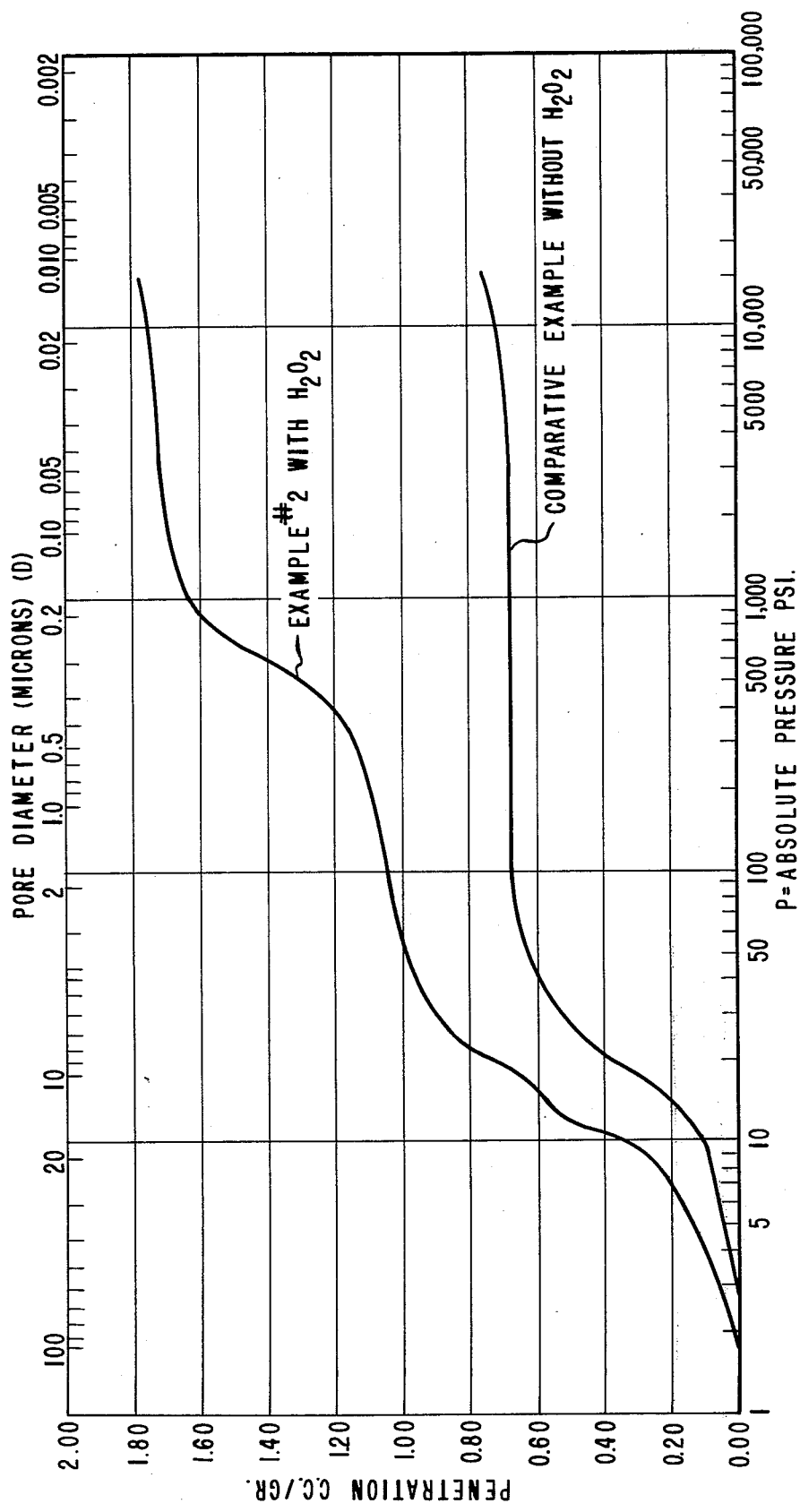

United States Patent [19]

Defrawi

[11] 4,011,302
[45] Mar. 8, 1977

[54] PROCESS FOR PREPARING HIGHLY ABSORBENT, LOW BULK DENSITY SODIUM SILICATE

[75] Inventor: Mohamed Defrawi, Memphis, Tenn.

[73] Assignee: E. I. Du Pont de Nemours and Company, Wilmington, Del.

[22] Filed: June 26, 1975

[21] Appl. No.: 590,494

[52] U.S. Cl. .............................. 423/332; 23/293 A; 264/42; 264/53
[51] Int. Cl.² ...................................... C01B 33/32
[58] Field of Search ............ 423/332, 334; 106/75; 23/293 A, 313 AS; 264/42, 53

[56] References Cited

UNITED STATES PATENTS

| 3,838,192 | 9/1974 | Bertorelli et al. | 423/332 |
| 3,932,140 | 1/1976 | Jayawant et al. | 423/334 |

*Primary Examiner*—Oscar R. Vertiz
*Assistant Examiner*—Wayne A. Langel

[57] ABSTRACT

A process for preparing low bulk density, highly absorbent, amorphous, hydrous, water-soluble alkali metal silicate particles having high internal porosity by spray drying a mixture of an aqueous sodium or potassium silicate solution and hydrogen peroxide.

7 Claims, 2 Drawing Figures

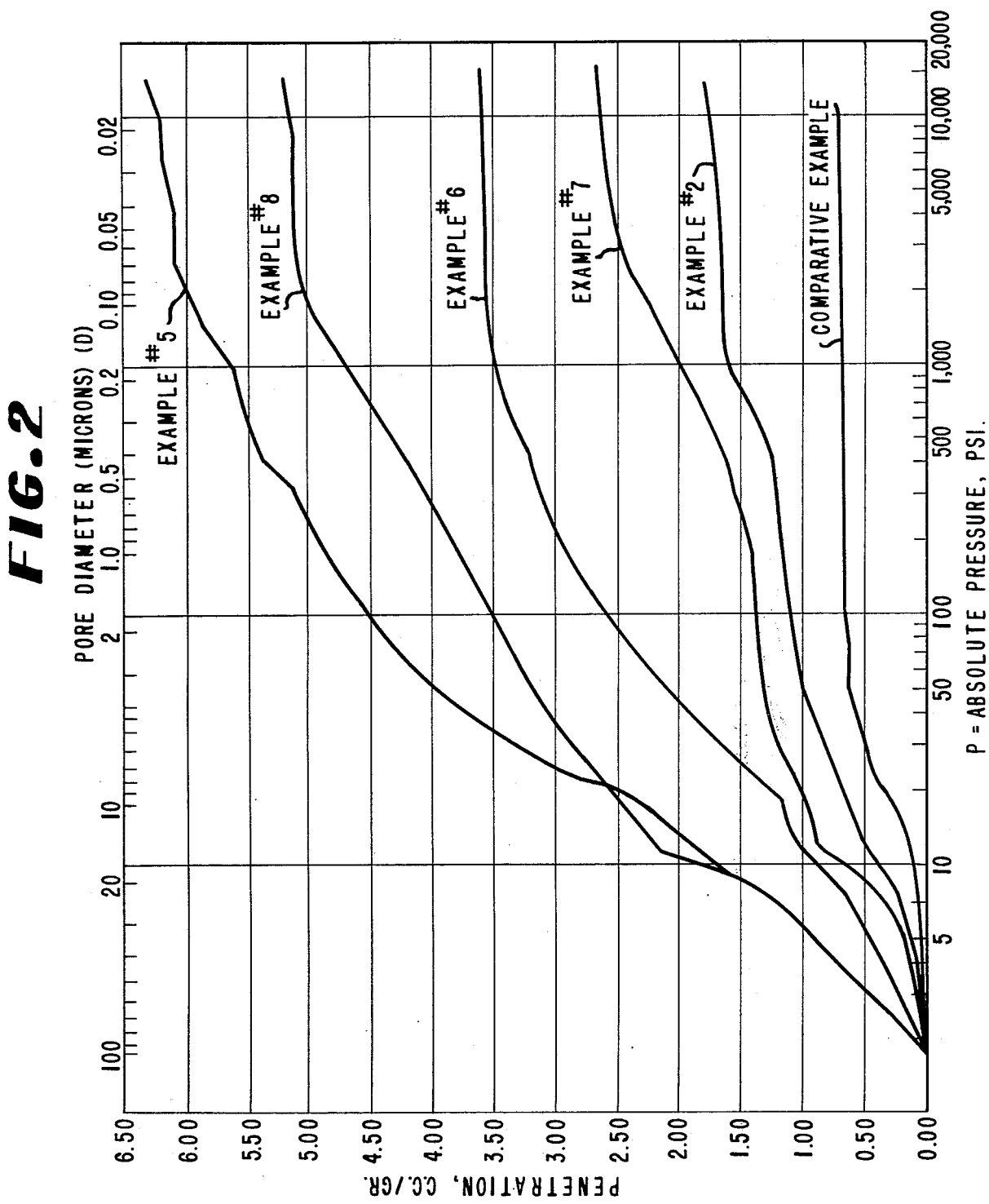

PROCESS FOR PREPARING HIGHLY ABSORBENT, LOW BULK DENSITY SODIUM SILICATE

BACKGROUND OF THE INVENTION

1. Field of the Invention

The present invention relates to a process for preparing highly absorbent powders of alkali metal silicates. More specifically, the present invention relates to a process for spray drying sodium or potassium silicate solution to prepare highly absorbent powders of sodium or potassium silicate with an unusually high degree of internal porosity.

2. Prior Art

Primarily because of environmental concerns, phosphates are considered an undesirable component of household detergents as substitute water-soluble sodium silicate powders have been added to perform some of the dirt-suspending and deflocculating functions of the phosphates and provide the necessary alkainity for a satisfactory cleaning operation. Enhanced cleaning has also been sought by increasing the concentration of ionic surfactants such as sodium salts of linear alkyl-aryl sulfonates and nonionic surfactants. The latter are more desirable because they do not generate the "curds" (soap) of hardness ions in water in the absence of an effective sequestering agent such as phosphate. Problems have been encountered in using these modified formulations because of the increase in the amounts of the low melting, relatively soft sodium alkyl-aryl sulfonates and the substantial increase in the amount of liquid nonionic materials. This has led to soft, sticky detergent powders which do not flow well and which cake badly in the box on storage.

It is therefore imperative that a highly absorbent material be provided which is suitable in both an ecological sense and in a commercial sense, the latter being as a constituent of detergent formulations which can serve as a carrier to absorb large amounts of nonionic detergents. Such a material is disclosed in U.S. Pat. No. 3,839,226 and copending application Ser. No. 472,094, filed May 22, 1974, now U.S. Pat. No. 3,932,140. However, the processes disclosed therein require a multiplicity of steps and larger equipment investment. Thus, there is a need for a desirable process for preparing commercial quantities of silicate powders having improved absorbency.

SUMMARY OF THE INVENTION

Now it has been found that water-soluble sodium or potassium silicate particles with low bulk density, small size and a high degree of internal porosity can be prepared by spray drying a mixture of a concentrated solution of sodium or potassium silicate in water with an aqueous hydrogen peroxide solution.

Accordingly, low bulk density, highly absorbent amorphous, hydrous, water-soluble sodium or potassium silicate particles having a unique structure and an unusually high degree of internal porosity are prepared by a process comprising mixing a concentrated aqueous solution of sodium or potassium silicate with an aqueous hydrogen peroxide solution to form a mixed solution having a viscosity of from 10 to 300 centipoises, preferably 50 to 150 centipoises, spray drying the mixed solution containing 5 to 20% by weight hydrogen peroxide to a dry powder at a temperature of from about 450° to about 800° F and recovering the dried sodium or potassium silicate particles.

The concentrated solutions of sodium or potassium silicate of this invention are aqueous solutions having a silica to sodium or potassium oxide mole ratio of from about 2:1 to about 3.5:1.

DESCRIPTION OF THE INVENTION

The process of the present invention involves spray drying of the aqueous mixture of a hydrogen peroxide solution and a sodium or potassium silicate solution by atomizing this mixture through a spray nozzle or other atomizing device into a chamber or tower where hot gases are injected to remove the liquid content. The product obtained is a dry powder that possesses the properties described hereinafter.

Generally the solids content of the solution mixture at the viscosities indicated will be 30 to 45% solids. Viscosities greater than 300 centipoises cannot be easily pumped and atomized by the spray dryer. If the mixtures were preheated to reduce the viscosity thereby permitting higher solids, the hydrogen peroxide decomposition would undesirably begin before spraying. Normally, it would be expected that relatively low viscosities would give dilute solutions which would therefore require more energy consumption in drying. However, this is not necessarily the case because it is believed that the hydrogen peroxide decomposition releases heat which is used in evaporating part of the excess water. However, viscosities of less than 10 centipoises are operable but are not economically desirable due to the excess energy required to remove the desired amount of water.

The viscosity of the mixed solutions of peroxide and the silicate of this invention were determined with an Ostwald viscometer.

Thus, the mixture of the sodium silicate or potassium silicate and hydrogen peroxide of this invention is dried by pumping the mixture to a spray dryer operated at a temperature of from about 450° to about 800° F, preferably 500° to 700° F as measured by the inlet temperature of hot gases to the spray dryer. Mixing of the hydrogen peroxide and silicate solutions must be under mild agitation and preferably not more than 6 to 8 hours at room temperature before spray drying. However, longer periods are operable at lower temperatures. Below 450° F the short residence times that characterize the dryer used in the examples do not allow sufficient expansion of particles to give a high absorbency. Above 800° F it is economically undesirable and there is a danger of overdrying.

Normally, the spray drying of sodium silicates or potassium silicates having mole ratios of 2:1 to 2.4:1 of $SiO_2:Na_2O$ or $K_2O$ is conducted at 300 to 450° F. In attempting to find a method of commercially producing highly absorbent alkali metal silicates utilizing the teachings of U.S. Pat. No. 3,932,140, it was expected that temperatures less than 300° to 450° F would have to be used to prevent damage to the porous structure of the product. Quite surprisingly, the desired product could not be obtained by spray drying at temperatures below 450° F. The hot gas temperature of the spray dryer of 300° to 450° F did not give the product of this invention. It was also surprising that the hydrogen peroxide did not decompose sufficiently to prevent the ultimate product formation desired when mixed with the alkaline silicate medium before spray drying.

Thus, the highly absorbent alkali metal silicates described herein may be produced by mixing a hydrogen peroxide and sodium or potassium silicate solution under mild agitation and ambient conditions, not more than eight hours before spray drying, and spray drying the silicateperoxide mixture having a viscosity of 10 to 300 centipoises, at temperatures of from 450° F to 800° F.

While a product similar to the product of the process of the present invention is described in U.S. Pat. No. 3,932,140, the product of the present invention differs somewhat therefrom and is described hereafter by the tests that follow.

Stereoscan electron micrographs show that the product resulting from the present invention has a unique structure which provides a high degree of porosity with pores which are large enough to permit rapid absorption and yet not so large that they fail to retain the absorbed materials as a result of capillary attraction.

The process of this invention yields low bulk density powders of amorphous, hydrous, water-soluble sodium and potassium silicates which are highly absorbent. For example, sodium silicate powders of less than 60 mesh size U.S. Standard Screen number were prepared according to the process of this invention. The addition of detergent oil on mixing formed 10 to 40 mesh agglomerates. The absorptive structure of the product can be characterized by the application of three different techniques: tamped bulk density, oil absorption and mercury porosimetry.

Different techniques must be used since each technique has certain limitations if used alone. For example, measurement of the bulk density determines both the space within particles, which is useful for absorptive purposes, the space between particles, which is of little value for absorptive purposes and the closed porosity, which is of no value. Usually the lower the bulk density the greater the absorbtivity everything else being the same. The oil absorption measures the absorptive capacity quickly but alone does not measure the absolute absorbtivity. The mercury porosimetry more accurately measures the true absorption capacity by measuring the total open pore volume and the pore size distribution. Thus, the combined tamped bulk density, oil absorption and mercury porosimetry more accurately show the ability of particles to absorb.

Tamped Bulk Density

The tamped bulk density is the bulk density of the product after it has been tamped to where it is packed tight in a graduated jar without applying direct pressure.

The desired range of bulk densities for the product of the invention should be between 0.1 g/cc to 0.5 g/cc with the range between 0.1 g/cc and 0.3 g/cc being preferred. Above about 0.5 g/cc there is simply not enough porosity, even if it were all available (that is, none of the pores were closed) to exhibit the high absorption desirable. Below 0.1 g/cc the handling characteristics of the products become quite difficult since such light materials are difficult to mix satisfactorily with other components having higher densities. Within the preferred range of 0.10 to 0.3 g/cc, an excellent balance is achieved between good handling characteristics and satisfactory mixing with other constituents of detergent compositions without segregation due to density differences on one hand and a high absorbency on the other.

Oil Absorption

The amount of oil absorbed by the silicates spray dried by the process of this invention is indicative of the porosity of the particles. The test used for determining oil absorption is called Oil on the Side of Beaker or OSB. A nonionic surfactant, e.g., Neodol 45-11, which is a copolymer of an average of 45 $C_{14}$ to $C_{15}$ units and 11 ethylene oxide units, sold by the Shell Chemical Company, is preheated to about 70° C and gradually added to a known weight of product while mixing until a film begins to show on the side of the beaker. The weight of oil added is recorded as a percentage of the weight of silicate used. This end point roughly corresponds to the loss of the freeflowing property of the product. Generally, the OSB will be greater than 50%, and preferably 100% or higher for the silicates of the present invention. Thus, the silicates of this invention have a high degree of absorbency for nonionic surfactants.

Mercury Porosimetry

A more accurate measure of the true absorptive capacity can be obtained by measuring the total pore volume. A Winslow mercury porosimeter measures the pore volume and also the distribution of pore diameters. In the test used mercury is forced under pressure into the pores of a porous material—the smaller the pore diameter, the higher the pressure of mercury required to penetrate and fill the pore. In the mercury porosimeter technique, mercury is forced under pressure into the pores and the size of the pores is determined by the amount of pressure which must be exerted to fill a given amount of cubic centimters of pore volume. It is desirable for at least 1cc of mercury to be absorbed per gram of sodium or potassium silicate at applied pressures of 2000 psi. This corresponds to pores of approximately 0.1 micron in diameter or larger. Generally, larger pores are desired since they absorb the nonionic surfactant quickly.

FIGS. 1 and 2 are graphs showing the examples of the present invention and the relationship of pore diameter with penetration and absorbency in comparison to the comparative examples.

In the graphs labeled FIGS. 1 and 2 it can be seen that in the porosity determinations for silicates prepared according to the invention that as the absolute pressure increases, the penetration in cubic centimeters increases rapidly and then tends to increase slowly with increased pressure. Note the difference in FIG. 1 between Example 2 and the comparative example. The graphs show that there are a greater number of pores in the material from the examples of the invention (See FIG. 2) than in the comparative example. Note that at, e.g., 2000 psi the penetration was about 1.7cc/gr in Example 2 while only 0.6cc in the comparative example. Mercury porosimetry is an absolute measure of porosity. The absorptivity as measured by the Oil on the Side of the Beaker (OSB) test merely shows a limited or a practical measure of absorptivity because after longer periods of time than provided for in the test, oil penetrates into the smaller pores thereby permitting more oil to be added. Thus, the OSB is a rapid or practical measurement of absorptivity.

The process of this invention yields a product characterized by an unusual degree of internal porosity, with the pores being of large enough pore diameter to permit rapid absorption, and yet not so large that it fails to retain materials as a result of capillary attraction.

A further important property of the product yielded by the process of this invention is the rate of solution in water which is related to particle size, water content, and the $SiO_2$ to sodium or potassium oxide weight ratio of the product. In general, the rate of solution increases as the particle size diminishes, the water content increases and the ratio of $SiO_2$ to sodium or potassium oxide lowers. Since one of the uses of the products of this invention is in detergent applications, it is important that they have very high rates of solution. Stated in absolute terms, at least 90% of the particles totally dissolve in 100 cc of water in 5 minutes at 25° C. The rate of solution can be determined by dissolving a one-gram sample in 100 ml of water, filtering after a specified time (e.g., 5 minutes) and titrating with a mineral acid to determine the dissolved alkalinity. A similar degree of solution will occur in less than 30 seconds at a temperature of 60° C, or normal hot water washing temperatures.

The water content of the sodium or potassium silicate powders or particles of the invention is a variable which must be maintained within closely regulated limits. As the water content of the silicate powder gets higher, the silicate becomes softer and exhibits viscous flow to a degree which completely precludes the possibility of isolating and maintaining the type of open, porous structure which is necessary for many uses. Therefore, it is vital that the water content of the silicate does not exceed 22%, preferably 20% by weight of the silicate. Since, as previously noted, the solubility must also be maintained at very high values, it is also undesirable to allow the water content to approach too low a value or a slow rate of solution will result. Therefore, it is necessary to have at least 12% and preferably 14% by weight of water based on the weight of the silicate in product of the invention. The most preferred range is from 14% to 20% by weight of water.

The sodium or potassium silicates of this invention have an active oxygen content of no more than about 2.0% by weight. In other words, any active oxygen present would remain essentially as an impurity because hydrogen peroxide is one of the starting materials used in the process of the invention. The negligible active oxygen content is important since appreciable amounts of active oxygen may adversely affect the chemical properties and reactivities of the compositions in which the silicates are used. Even in those end uses in which active oxygen releasing agents are used such as in laundry and dishwashing detergents, cleansers and the like, the addition of further quantities of active oxygen is often deleterious. For example, indiscriminate addition of active oxygen-containing compounds to detergents can result in destruction of or damage to fabric, optical brighteners, fabric dyes, perfumes, disinfectants and other readily oxidizable organic ingredients in the detergent compositions. Use of active oxygen-containing compounds in dishwashing detergents containing citrate or nitrolotriacetate sequestering agents will result in an oxidative attack of the peroxide on the organic moieties. No such results arise when the sodium or potassium silicates of this invention are used since they either contain no active oxygen or else only harmless residual amounts as an impurity.

It is also necessary that the $SiO_2$ to sodium or potassium oxide ratio in the silicate is maintained within certain limits, generally from about 2:1 to approximately 3.5:1. More alkaline compositions having ratios of silica to sodium or potassium oxide below 2:1 are too alkaline to permit mixing with hydrogen peroxide prior to spray drying without hydrogen peroxide decomposition even at room temperature. Higher ratios of silica to sodium or potassium oxide, above 3.5, are too viscous to spray dry and are also limited in terms of solubility.

The art is familiar with lower ratio crystalline water-soluble sodium silicates such as sodium metasilicates, sodium orthosilicates, and sodium sequisilicates. These very low ratio (alkaline) silicates are rapidly water-soluble, but their high alkalinity makes them unsuitable for many uses, including uses in general purpose detergents. Silicates having weight ratios of $SiO_2$ to, e.g., sodium oxide within the range of the products of this case, that is from a weight ratio of 2:1 to 3.5:1, cannot be crystallized and exist, so far as is known, only as amorphous materials. The amorphous nature can be determined by examination with X-rays.

Thus, the product of the process of the invention is a dried, amorphous, free-flowing material with irregularly shaped particles having a silica to sodium or potassium oxide ratio of 2:1 to 3.5:1, a water content of 14 to 22%, an absorptivity of from more than 50% preferably about 100% or more, a bulk density of 0.1 g/cc to 0.5 g/cc, and less than 2% by weight active oxygen. The product has a capacity for absorbing organic liquids and remaining free-flowing. Absorption of over 100% of its own weight of a liquid nonionic detergent is possible. Specifically, absorption of 50 to 200% of its own weight of a liquid nonionic detergent on the spray dried particles of this invention can be achieved. Thus, the products resulting from the process of the present invention are useful as carriers for liquid active ingredients in powdered or granular detergent formulations.

In contrast, the silicates prepared according to known procedures with a spray dryer are smooth spherical hollow particles having a bulk density of higher than 0.65 g/cc and an absorptivity of 10 to 20% maximum.

In the process of the invention the quantities of hydrogen peroxide in the aqueous mixture to be spray dried based on the weight of the sodium silicate can range from as little as 5% by weight to as high as 20%. The hydrogen peroxide concentration in aqueous solution ranges from about 20 to 100%, preferably 30 to 70% by weight. Concentrations of lower than 20% require the addition of large amounts of water which must then be evaporated off. While 100% peroxide can be used in this application, the hazards associated with handling and using such concentrated peroxide solutions make this less than a preferred concentration. The preferred concentration of from 30 to 70% hydrogen peroxide are safe, effective and easy to handle.

The hydrogen peroxide aqueous solution is added to the aqueous sodium or potassium silicate or the silicate added to the peroxide and mixed. The solution mixture increases in viscosity as the solids of the mixture are increased. However, any mixture with a viscosity that will permit passage through the spray dryer nozzle is operable provided preheating is not required to reduce the viscosity. Viscosities of about 10 to about 300 cp are required to pass through the nozzles of the spray dryer. This may vary somewhat with different nozzles. In another variation of the spray drying process of this invention, silicate solutions may be sprayed simultaneously but independently with H₂O₂ solution with contact being made before the discharge from the nozzle of the spray dryer to effect adequate mixing in the spray dryer.

The air flow was cocurrent with the silicate flow in all the examples of the present application. However the process of the present invention includes countercurrent flow and cocurrent flow. The residence time of the silicate-peroxide mixture of the present invention may vary rather widely depending on the size of the unit. In the 30-inch diameter spray dryer used in the examples herein the contact time was 3 to 5 seconds. In, for example, a 20-foot diameter unit at a rate of 20 million to 30 million pounds per year of product the residence time would be about 15 seconds. In larger units the residence time and the air flow rates and temperatures would have to be adjusted with the ranges given herein.

The highly absorbent products resulting from the process of this invention are particularly important in the formation of nonpolluting detergents since they can readily absorb the nonionic detergent into their structure thereby allowing the manufacturer to avoid the air pollution which results when the nonionic fluid is put through a spray tower. The absorption of the nonionic detergents into the powder particles of this invention can be accomplished by contacting the sodium or potassium silicate powder or granules with the nonionic liquid under conditions of mild agitation, such as tumbling in a cone-blender or drum blending by spraying the nonionic liquid onto the powder or granules to achieve a uniform distribution of the liquid to be absorbed while agitating the powder particles. The sodium or potassium silicate of the invention can be loaded with from 50 to 200% based on the OSB tests, preferably more than 100% of nonionic detergent. The sodium silicate at this time has essentially all of its internal pores filled but still remains a free-flowing powder which does not agglomerate upon storage and which mixes easily with other powder constituents of detergents. The sodium or potassium silicate of this invention is particularly advantageous over other silicates, such as spray-dried silicates without hydrogen peroxide, because of their high absorbency level.

The invention is further illustrated but is not intended to be limited by the following examples in which all parts, percentages and ratios are by weight unless otherwise specified.

EXAMPLES 1 to 8

Hydrogen peroxide of the concentration indicated below was added to a 47% by weight sodium silicate solution in quantities sufficient to reach the viscosity indicated at the mole ratio of silica to sodium oxide of 2.4:1 at room temperature while stirring gently at 20 to 50 RPM with a propeller-type agitator. The mixture was introduced into the atomizing chamber of a 30-inch diameter spray dryer having cocurrent air flow. In all the examples either a wheel atomizer of 2-inch diameter at 30,000 to 45,000 RPM or a nozzle atomizer was used. The atomizer was adjusted to give the feed rate shown and hot air was introduced into the drying chamber at the temperature indicated. The dry product was collected in a cyclone separator and was tested as shown below. The mercury porosimetry tests are summarized in the table that follows. In the table the mercury porosimetry test for Examples 1 and 3 was unsatisfactory due to the low penetration of 1.0 cc/gr of sample at 2000 psi. The mercury porosimetry test for Example 4 indicates a marginal product (1.55 cc/gr of sample at 2000 psi); however, the peroxide level was too high.

| Example | Additive | Weight Ratio H₂O₂ Solution: (SiO₂)₂·₄Na₂O Solution | Inlet Air Temp. | Solution Feed Rate ml./min. (Atomizer) | % H₂O in Product | % H₂O₂ in Product | T.B.D.* g./cc. | O.S.B.** |
|---|---|---|---|---|---|---|---|---|
| 1 | 30% H₂O₂ | 1:5 | 390° F | 200 (wheel) | 17.8 | 4.44 | 0.59 | |
| 2 | 30% H₂O₂ | 1:5 | 500° F | 200 (wheel) | 14 | 1.2 | 0.30 | 50 |
| 3 | 30% H₂O₂ | 1:5 | 300° F | 106 (wheel) | 18.6 | 3.8 | 0.66 | |
| 4 | 30% H₂O₂ | 1:5 | 300° F | 200 (nozzle-82–88 psig) | 19.9 | 5.5 | 0.42 | |
| 5 | 30% H₂O₂ | 1:5 | 700° F | 500 (nozzle-50 psig) | 16.5 | 1.2 | 0.125 | 84 |
| 6 | 30% H₂O₂ | 1:5 | 700° F | 460 (nozzle-50 psig) | 12.2 | 1.5 | 0.16 | 58 |
| 7 | 45% H₂O₂ | 1:7.5 | 500° F | 200 (wheel) | 13.3 | 1.63 | 0.28 | 44 |
| 8 | 45% H₂O₂ | 1:7.5 | 600° F | 400 (nozzle-50 psig) | 17.9 | 1.8 | 0.17 | 74 |
| Comparative | Water | 1:5 (H₂O:Silicate) | 500° F | 200 (wheel) | 16.0 | N.A. | 0.66 | 12 |

*T.B.D. = Tamped bulk density.
**O.S.B. = Oil on side of beaker. Nonionic detergent oil Neodol 45-11 was used in the O.S.B. tests.

If potassium silicate were used rather than sodium silicate, similar results would be obtained.

COMPARATIVE EXAMPLE

The procedure described in Examples 1–8 was followed except that water was substituted for the hydrogen peroxide. The data obtained is summarized in the above table.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as set forth in the claims.

What is claimed is:

1. A process for the preparation of a water-soluble, highly absorbent, sodium or potassium silicate comprising mixing an aqueous alkali metal silicate selected from sodium silicate and potassium silicate having a mole ratio of silica to sodium or potassium oxide of from 2:1 to 3.5:1 with a 20 to 100% by weight hydrogen peroxide aqueous solution to form a mixture with a viscosity sufficiently low to pass through the spray dryer nozzle without preheating and spray drying the mixture having a 5 to 20% by weight hydrogen peroxide content based on the weight of alkali metal silicate at a temperature of from about 450° to about 800° F and collecting a sodium or potassium silicate product having a water content of from 12 to 22% by weight, a bulk density of 0.1 g/cc to 0.3 g/cc and an absorbency of 50 to 200% based on the OSB test.

2. The process of claim 1 wherein the viscosity of the mixture of silicate solution and peroxide solution is from 10 to 300 centipoises as measured with an Oswald viscometer.

3. The process of claim 2 wherein the viscosity is 50 to 150 centipoises.

4. The process of claim 1 wherein the temperature is 500° to 700° F.

5. The process of claim 1 wherein the water content of the silicate product is 14 to 20% by weight.

6. The process of claim 1 wherein the alkali metal silicate is sodium silicate.

7. The process of claim 1 wherein the alkali metal silicate is potassium silicate.

* * * * *